United States Patent
Burger et al.

(10) Patent No.: US 9,471,944 B2
(45) Date of Patent: Oct. 18, 2016

(54) DECODERS FOR PREDICTING AUTHOR AGE, GENDER, LOCATION FROM SHORT TEXTS

(71) Applicant: The MITRE Corporation, McLean, VA (US)

(72) Inventors: John Burger, McLean, VA (US); John Henderson, McLean, VA (US); George Kim, McLean, VA (US); Jeffrey Zarrella, McLean, VA (US)

(73) Assignee: THE MITRE CORPORATION, McLean, VA (US)

( * ) Notice: Subject to any disclaimer, the term of this patent is extended or adjusted under 35 U.S.C. 154(b) by 223 days.

(21) Appl. No.: 14/063,595

(22) Filed: Oct. 25, 2013

(65) Prior Publication Data

US 2015/0120755 A1    Apr. 30, 2015

(51) Int. Cl.
*G06F 17/30* (2006.01)
*G06Q 50/00* (2012.01)

(52) U.S. Cl.
CPC ......... *G06Q 50/01* (2013.01); *G06F 17/30867* (2013.01)

(58) Field of Classification Search
CPC .................. G06F 17/30861; G06F 17/30867; G06Q 50/00; G06Q 50/01; G06Q 50/02
USPC ....... 707/732, 733, 734, 748, 724, 729, 770, 707/803; 705/7.29, 7.31, 14.58, 14.64, 705/14.66, 319; 709/204, 224
See application file for complete search history.

(56) References Cited

U.S. PATENT DOCUMENTS

| | | |
|---|---|---|
| 7,853,445 B2 | 12/2010 | Bachenko et al. |
| 8,412,648 B2 | 4/2013 | Karypis et al. |
| 2007/0208728 A1 | 9/2007 | Zhang et al. |
| 2007/0282596 A1 | 12/2007 | Suzuki et al. |

(Continued)

OTHER PUBLICATIONS

Henderson J. et al. "Discriminating Non-Native English with 350 Words," *Proceedings of the Eighth Workshop on Innovative Use of NLP for Building Educational Applications*, Jun. 13, 2013, Atlanta, Georgia; pp. 101-110.
Burger J.D. et al. "Discriminating Gender on Twitter," *Proceedings of the Conference on Empirical Methods in Natural Language Processing*, 2011; pp. 1301-1309.

(Continued)

*Primary Examiner* — Greta Robinson
(74) *Attorney, Agent, or Firm* — Morrison & Foerster, LLP

(57) ABSTRACT

Disclosed are systems and methods for predicting demographics about authors of social media. A dataset relates features from social media messages to known demographic information about authors of the social media messages. The social media messages and known demographics may be retrieved from different social media services. Adjustable weights are associated with alternative demographic values for the features. The dataset is used to predict unknown demographics of users based on the adjustable weights associated with the alternative demographic values for extracted features from social media messages. A confidence level may be output for a predicted demographic that corresponds to a difference between a sum of weights associated with the predicted value and another demographic value. The predicted demographic value may be output when the confidence level exceeds a threshold. The weights may be updated when the confidence level is below the threshold even when the prediction is correct.

20 Claims, 6 Drawing Sheets

(56) References Cited

U.S. PATENT DOCUMENTS

| | | | |
|---|---|---|---|
| 2008/0104225 | A1 | 5/2008 | Zhang et al. |
| 2008/0126411 | A1 | 5/2008 | Zhuang et al. |
| 2011/0040760 | A1* | 2/2011 | Fleischman et al. ......... 707/737 |
| 2012/0209795 | A1* | 8/2012 | Glickman ....................... 706/12 |
| 2012/0254333 | A1 | 10/2012 | Chandramouli et al. |
| 2012/0324027 | A1* | 12/2012 | Vaynblat ................ G06Q 50/01 709/206 |
| 2013/0018896 | A1* | 1/2013 | Fleischman et al. ......... 707/748 |
| 2013/0325977 | A1* | 12/2013 | Drews et al. ................. 709/206 |
| 2014/0089322 | A1* | 3/2014 | Garcia .............. G06F 17/30867 707/748 |

OTHER PUBLICATIONS

Peersman C. et al. "Predicting Age and Gender in Online Social Networks," Proceedings of the 3$^{rd}$ International Workshop *SMUC '11*, Oct. 28, 2011, Glasgow, Scotland; pp. 37-44.

Miller Z. et al. (Oct. 2012). "Gender Prediction on Twitter Using Stream Algorithms with *N*-Gram Character Features," *International Journal of Intelligence Science* 2(24): 143-148.

Kucukyilmaz T. et al. (2006). "Chat Mining for Gender Prediction," *Advances in Information Systems 2006, Lecture Notes in Computer Science* 4243: 274-283.

* cited by examiner

| Sample Feature | Probability of Demographic 1 | Probability of Demographic 2 | Probability of Demographic 3 |
|---|---|---|---|
| ! | 0.634 | 0.212 | 0.221 |
| _lov | 0.801 | 0.634 | 0.801 |
| :) | 0.725 | 0.201 | 0.725 |
| my | 0.001 | 0.721 | 0.001 |
| haha | 0.834 | 0.011 | 0.134 |
| Too_ | 0.851 | 0.554 | 0.651 |
| yay! | 0.025 | 0.851 | 0.005 |
| SoCal | 0.051 | 0.015 | 0.221 |
| y_: | 0.344 | 0.221 | 0.525 |
| hair_ | 0.321 | 0.025 | 0.021 |
| _kid_ | 0.435 | 0.231 | 0.816 |
| _http | 0.521 | 0.425 | 0.751 |
| so | 0.035 | 0.521 | 0.225 |
| ooo | 0.331 | 0.326 | 0.012 |

FIG. 6

DECODERS FOR PREDICTING AUTHOR AGE, GENDER, LOCATION FROM SHORT TEXTS

FIELD

The present invention relates to predicting demographic information about users of social media. More specifically, the invention relates to systems and methods for predicting demographics about authors of social media based on features extracted from the social media.

BACKGROUND

Social networking service providers facilitate creating, distributing, and exchanging social media between users in virtual communities called social networks. Service providers include, for example, FACEBOOK and TWITTER. These service providers offer interactive online portals that are accessible through client devices such as personal computers, tablets and smartphones. Depending on the social network, a user can register with a service provider, create a profile, add other users to their social networks, exchange social media, and receive notifications from the service provider. A user may join different social networks to share social media of common interest to a single user or an entire group of users in a particular social network.

There are many types of service providers. Some are focused on facilitating building personal networks based on friendships or social interests, such as FACEBOOK and TWITTER. Others are more focused on building professional relationships by connecting users with similar career interests, and allow users to market themselves in social networks, such as LINKEDIN. Other social networks, such as YOUTUBE and FLICKR, are more directed to facilitating the sharing of multimedia, such as pictures, audio and video. However, the differences between social networks are becoming fewer as service providers continue to add additional functionality.

User profiles are provided by some social media service providers, and include fields for users to input limited demographic information, such as a name and location. However, many service providers fail to request or store any demographic information about their users. Thus, most profiles linked to social media include limited, or fail to include any, fields for users to input demographic information. Moreover, user-provided demographics available by social networking service providers are limited and unreliable because users may not disclose demographic information or may disclose incorrect demographic information. Consequently, there is no reliable way to determine or predict user demographics about authors of social media.

SUMMARY

Described herein are systems and methods for predicting demographics about authors of social media. The predictions are relatively transparent to users, agnostic to language, and can adapt to changing content in social media.

Employing such systems and methods allows companies to tailor their advertisements to a particular demographic or, conversely, learn about how a particular demographic feels about a subject or product. For example, a sentiment analysis can be conducted on a dataset of social media to understand how people in a particular demographic group feel about a product, service, policy, person, or the like. In a broader sense, the described systems and methods increase the value of social media by providing service providers and third parties with more information about users without asking probing questions, and allow users to experience social networks that are customized based on demographic information.

In some embodiments, a method for creating a dataset that relates features in social media messages to demographic information includes extracting features from social media messages that are authored by users of a social media service. A processor is used for retrieving demographics about the users that authored the social media messages and for correlating the features from the social media messages with the demographics. The correlation is stored in memory.

In some embodiments, social media messages authored by users are retrieved from a first social media service, and demographics for the users that authored the social media messages are retrieved from a second social media service. In some embodiments, the first social media service is TWITTER and the second social media service is FACEBOOK. In some embodiments, social media messages are associated with profiles for users that authored social media messages. In some embodiments, the profiles include links to the second social media service. In some embodiments, demographics include gender and at least one of age, location, and marital status. In some embodiments, the features include an n-gram of words and an n-gram of characters.

In some embodiments, a method for creating a dataset for predicting demographics of users that author social media messages includes designating tracks of fields in a dataset of social media messages stored in memory. Features are extracted from social media messages based on the designated fields. Demographics that include alternative demographic values and that are associated with the features are retrieved. A processor is used for generating adjustable weights associated with the alternative demographic values from two or more of the features. Demographics are predicted of users that author social media messages based on the adjustable weights associated with the alternative demographic values from the two or more of the features.

In some embodiments, tracks include an n-gram of words, an n-gram of characters, or both. In some embodiments, the demographics include gender, age, or location.

In some embodiments, a method for predicting a demographic about an author of a social media message includes extracting features from a social media message stored in memory. A processor is used for determining weights associated with the extracted features and for predicting a demographic value about an author of the social media message based on a sum of the weights associated with the extracted features.

In some embodiments, weights associated with an extracted feature correspond to different alternative values for a particular demographic about the author of the social media message. In some embodiments, a confidence level is output for a predicted demographic that corresponds to a difference between a sum of weights associated with the predicted value and a sum of weights associated with another demographic value. In some embodiments, the sum of the other demographic value is lower than the sum of the predicted demographic value. In some embodiments, the confidence level corresponds to an accuracy that the predicted demographic value corresponds to an actual demographic value of an author of the social media message.

In some embodiments, the predicted demographic value is output when the confidence level exceeds a threshold. In some embodiments, at least one of the weights is updated when the confidence level is below the threshold even though the prediction is correct. In some embodiments, the predicted demographic includes a marital status.

In some embodiments, a system for creating a dataset that relates features in social media messages to demographic information includes a memory that stores features from social media messages that are authored by users of a social media service. A processor retrieves demographics for the users that authored the social media messages and correlates the features with the demographics.

In some embodiments, a system for predicting a demographic about an author of a social media message includes a memory that stores a social media message. A processor extracts features from the social media message, determines weights associated with extracted features, and predicts a demographic value about an author of the social media message based on a sum of the weights associated with the extracted features. In some embodiments, the processor outputs a confidence level for the predicted demographic that corresponds to a difference between the sum of the weights associated with the predicted value and a sum of the weights associated with another demographic value.

BRIEF DESCRIPTION OF THE DRAWINGS

Exemplary embodiments of the invention will now be described with reference to the accompanying drawings, in which:

FIG. 6 is a table showing examples of features that may be used to make various predictions about different demographics of authors of social media according to embodiments of the invention.

To facilitate understanding, identical reference numerals have been used, where possible, to designate identical elements that are common to some of the figures.

DETAILED DESCRIPTION

Figure 1:
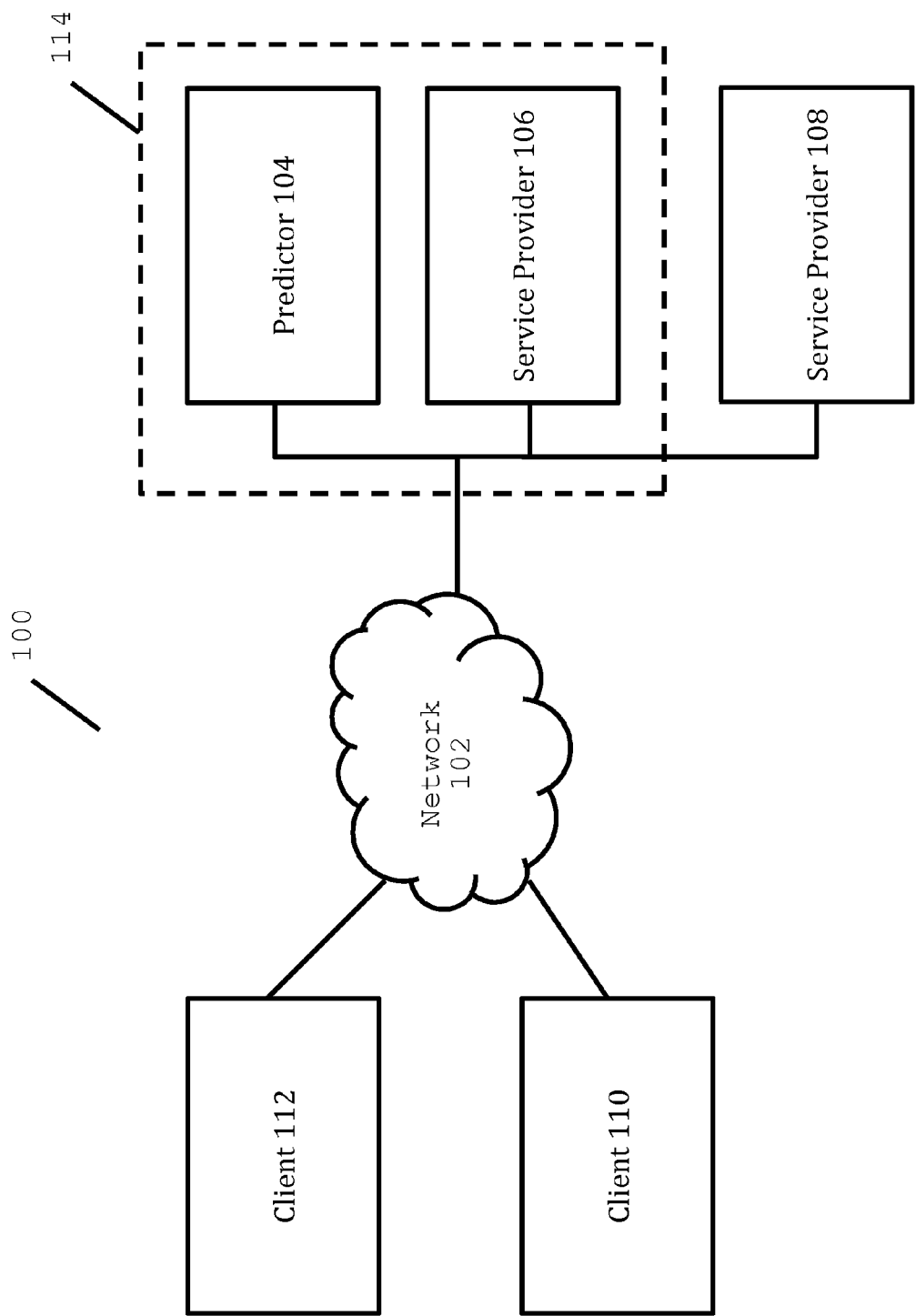
FIG. 1 is an illustration of a networked system according to embodiments of the invention.

The systems and methods described herein predict demographics about authors of social media based on the content of their social media, without asking users probing questions about demographic information. The systems and methods create and utilize a dataset that associates content of social media with known demographics for predicting unknown demographics about authors of other social media. A prediction model is derived from the dataset, and the dataset may comprise a subset of social media messages, profile information and metadata, or combinations thereof.

The prediction model is applied to formatted social media from authors of unknown demographics. Features are extracted from the social media and used by the prediction model to determine which features indicate that the author belongs to a particular demographic. The social media and known demographics used to build the dataset may be retrieved from the same or different service providers. The accuracy of predicting any demographic varies based on the volume and types of features analyzed. The disclosed prediction systems can significantly outperform existing systems and methods by using a variety of types and large quantity of features to predict demographics, rather than just relying on limited user-supplied demographic information in user profiles.

The systems and methods described herein generate a prediction model comprising social media associated with known user demographics, and then apply the prediction model to social media of users with unknown demographics to predict their demographics. Methods for creating the prediction model include correlating features from a set of social media with known user demographics. The social media may include messages authored by users of service providers. Features from the social media are extracted and stored in the prediction model. Known demographics about authors of the social media are extracted and also stored in the prediction model. The extracted features and known demographics may be correlated by using weights. The weights are adjusted depending on how features contribute towards making a prediction about a demographic of an author. The prediction model is then used to predict unknown demographics about authors of social media.

The systems and methods described herein may be implemented as a prediction system that compiles social media, extracts features, compiles user demographic information, learns to correlate the extracted features and demographic information, and outputs predictions about demographics of authors of unknown demographics.

The described systems and methods can be utilized in substantially any social media systems or electronic messaging systems to predict demographics about authors of messages. In some embodiments, the systems and methods work across social media services by predicting demographics of users with a dataset that is built from data from different social media networks in different services. In some embodiments, the systems and methods work using a dataset that is built from data from the same social media network that is being analyzed. The described systems and methods can be readily embodied as a stand-alone software program or integrated in another program as an Application Programming Interface (API). The program may, for example, reside at a server or client computer, or combinations thereof. Different software program modules may reside at a client, server or across multiple computing resources in a network. Nevertheless, to simplify the following discussion and facilitate reader understanding, the description will discuss the prediction system in the context of use within a software program that executes on a server to predict demographic information about authors of social media messages.

I. Computing Environment

The described systems and methods may be embodied as part of a computing system that includes a software program stored on a non-transitory computer readable medium. The software program can be executed by a CPU on a server configured to execute the program. This server may be the same or different from servers operated by a social networking service provider, such as FACEBOOK or TWITTER. Accordingly, the service provider may analyze its social media to predict demographics about its users. In some embodiments, the program resides in a remote server from the service provider. In these embodiments, a third-party may pay for services on demand to predict demographics about authors of social media. In some embodiments, the system may be connected to a plurality of service providers to facilitate predicting demographics about users on a number of different social networking services.

Social media may be transmitted between users registered to a social networking service over a communications network, such as the Internet. Other communications technology for transmitting social media may include, but are not limited to, any combination of wired or wireless digital or analog communications channels, such as instant messaging (IM), short message service (SMS), multimedia messaging service (MMS) or a phone system (e.g., cellular, landline, or IP-based). These communications technologies can include Wi-Fi, BLUETOOTH and other wireless radio technologies.

Social media may be transmitted to a server operated by or for a social networking service provider. The social media may then be transmitted to recipient users in a social network associated with a user sending the social media. The social media may be sent between client devices without passing through an intermediate server. In some embodiments, a client device can access output from the described system by using a portal that is accessible over the Internet via a web browser.

FIG. 1 depicts an embodiment of a system 100. The system includes client devices 108 and 110 that are configured to communicate with service providers 106 and/or 108 over network 102. System 100 includes predictor 104 that is configured to communicate with service provider 106 or clients 110 or 112, or any combinations thereof. Predictor 104 and service providers 106 and/or 108 may reside on a common server 114 or different servers. Predictor 104, service providers 106 and/or 108, or clients 108 and/or 110 can be or can include computers running ANDROID, MICROSOFT WINDOWS, MAC OS, UNIX, LINUX or another operating system (OS) or platform.

Client 110 or 112 can be any communications device for sending and receiving social media messages, for example, a desktop or laptop computer, a smartphone, a wired or wireless machine, device, or combinations thereof. Client 110 or 112 can be any portable media device such as a digital camera, media player, or another portable media device. These devices may be configured to send and receive messages through a web browser, dedicated application, or other portal.

Client 110 or 112, service provider 106 or 108, or predictor 104 may include a communications interface. A communication interface may allow the client or service provider to connect directly, or over a network, to another client, server or device. The network can include, for example, a local area network (LAN), a wide area network (WAN), or the Internet. In some embodiments, the client can be connected to another client, server, or device via a wireless interface.

As shown in FIG. 1, system 100 may comprise a server 114 operated by service provider 106 and predictor 104 that analyzes social media received by service provider 106 from clients 108 and/or 110. In some embodiments, service provider 106 and predictor 104 reside on different servers. Predictor 104 may analyze social media before or after it is received by service provider 106 from clients 110 or 112. In some embodiments, service provider 108 may supplement data used by predictor 104 to make predictions of demographics about users of service provider 106. Embodiments of the described systems and methods may employ numerous distributed servers and clients to provide virtual communities that constitute social media networks. FIG. 1 shows only two clients and two service providers for the sake of simplicity.

In some embodiments, predictor 104 may be distributed across several servers, clients, or combinations thereof. The server of predictor 104, service provider 106 or 108, or client 110 and/or 112 may each include an input interface, processor, memory, communications interface, output interface, or combinations thereof, interconnected by a bus. The memory may include volatile and non-volatile storage. For example, memory storage may include read only memory (ROM) in a hard disk device (HDD), random access memory (RAM), a solid-state drive (SSD), or the like. The OS and application programs may be stored in ROM.

Specific software modules that implement embodiments of the described systems and methods may be incorporated in software programs on a server or client. The software may execute under control of an OS, as detailed above. When stored on a server of predictor 104, embodiments of the described systems and methods can function and be maintained in a manner that is substantially, or totally, transparent to users of social networks.

As shown in FIG. 1, in one example, incoming social media from client 110 or 112 is sent over communications network 102 (such as the Internet) or through another networked facility (such as an intranet) or from a dedicated input source, or combinations thereof. In some embodiments, social media can originate from a wide variety of sources, such as by devices with textual keyboards, a video feed, a scanner or other input source. Input interfaces are connected to paths and contain appropriate circuitry to provide electrical connections required to physically connect the input interface to a larger system and to different outputs. Under control of an OS, software programs that run on a client or server exchange commands and data with external sources, via a network connection or paths to transmit and receive information from a user during execution of predictor 104 or service provider 106 or 108.

Client 110 or 112 or service provider 106 or 108 may also be connected to input devices, such as a keyboard or mouse. A display, such as a conventional color monitor, and printer, such as a conventional laser printer, are connected via leads and, respectively, to output interfaces. The output interfaces provide requisite circuitry to electrically connect and interface the display and printer to the computer system.

Through these input and output devices, a user can instruct service provider 106 to transmit social media and instruct client 110 or 112 to display social media. In addition, by manipulating an input device, such as by dragging and dropping a desired picture into an input field of a social media portal displayed at client 110 or 112, a user can move the picture to the server operated by service provider 106, as described above, and then service provider 106 can broadcast the picture to clients 110 or 112 that are operated by users of a social network.

Predictor 104 may be embodied in a product that a social media provider, for example TWITTER, can install on its platform. Predictor 104 can analyze social media on a recurring schedule, such as a previous day's TWITTER tweets or a previous day's trending topics or something similar, for example. Then, after using predictor 104, demographic information about users of service provider 106 and/or 108 can be used to understand a sentiment about the trending topic according to different demographics of users, or to target advertisements to the different demographics of users, for example.

Predictor 104 could be embodied as a JAVA tool, which means it can run on any platform that is JAVA enabled. Embodiments of predictor 104 can run on a web server that provides a website for administrators to access predictor 104 remotely over network 102. Anyone with administrative access to the web server can connect to user interface tools provided by predictor 104 to take actions within the user interface. Predictor 104 can run on any type of server, including virtual servers or an actual machine. Predictor 104 can be designed to operate in any computing environment.

Predictor 104 may be embodied on a distributed processing system to break processing apart into smaller jobs that can be executed by different processors in parallel. The results of the parallel processing could then be combined once completed. Features of predictor 104 can be provided to service provider 106 as a subscribed service.

II. Social Media

Figure 2:
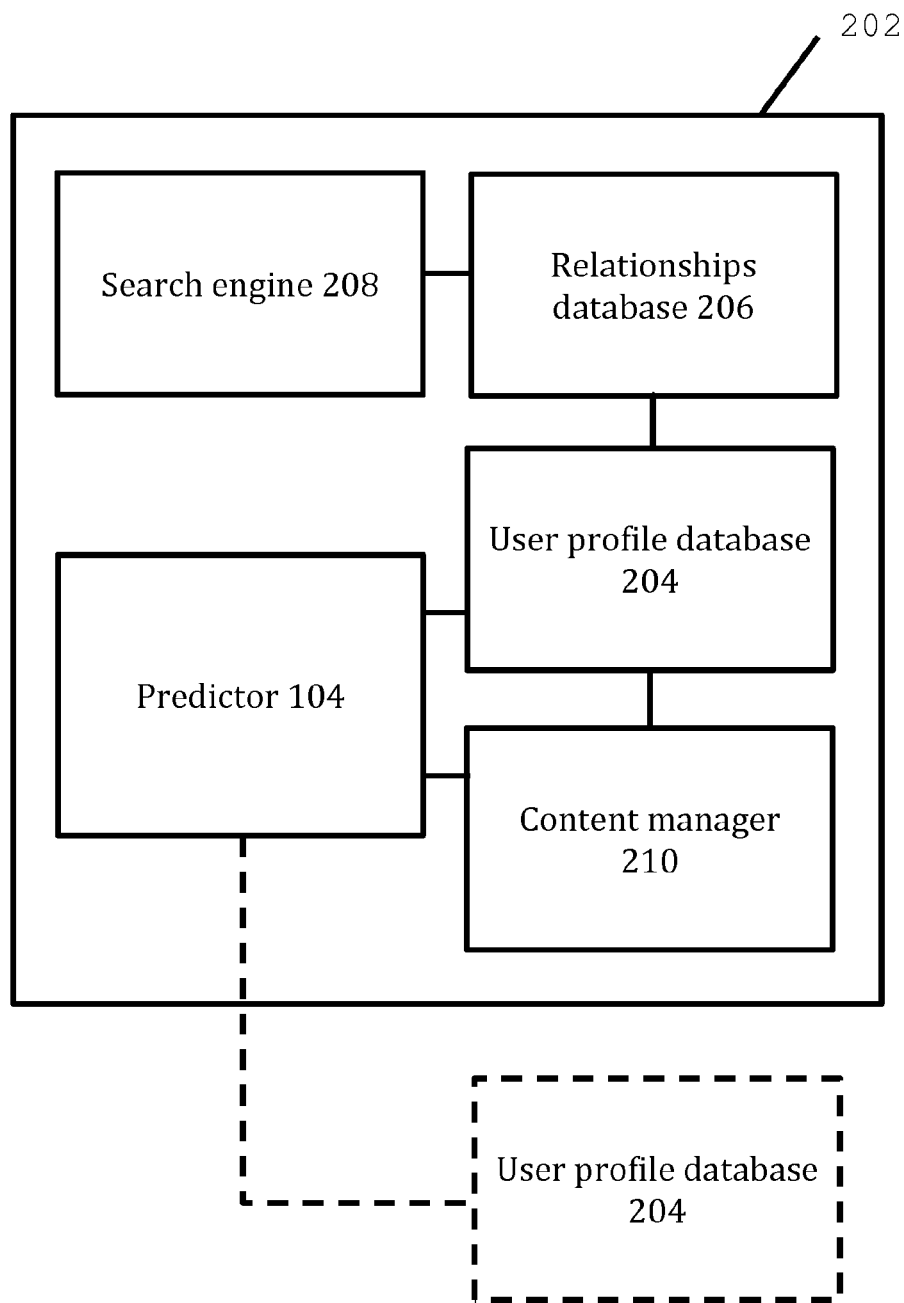
FIG. 2 depicts a service provider according to embodiments of the invention.

FIG. 2 depicts a service provider 106 that may be executed by server 202. In some embodiments, service provider 106 may be implemented in an array of servers. Server 202 provides an interactive portal that is accessible by users operating client devices 110 or 112 over network 102 to share social media in social networks. Server 202 may include user profile database 204, relationships database 206, search engine 208, social media content manager 210, and predictor 104. In some embodiments, predictor 104 may be external and remote from server 202.

FIG. 2 shows predictor 104 communicating with user database 204 and content manager 210. In some embodiments, user profile database 204 that is used by predictor 104 may be external and remote from server 202 as shown by broken black lines, which may correspond to a user profile database from service provider 108.

Users of social networking services, such as FACEBOOK or TWITTER, define their own social networks to share social media. Users tend to be attracted to the ease of sharing information on an informal basis in their social networks. The pervasiveness of social media has resulted in voluminous amounts of content distributed between and across social networks. In turn, this has sparked a great deal of interest from advertisers and other entities who seek to exploit the pervasiveness of social media. This includes entities who seek to know demographic information about authors of social media.

Users of service provider 106 and/or 108 create, exchange, or share social media. The users access service provider 106 and/or 108 through client devices 110 or 112, which may be embodied as smartphones or laptop computers. Client devices 110 and/or 112 provide web portals or dedicated applications to access an interactive platform, to share social media with their social networks. Users login to a social media portal by manually entering a username and password, or automatically with user identification information stored on client devices 110 or 112. The interactive platform allows users to participate in social media communications with social networks over network 102. For example, a social media portal may include text fields, voice recognition or video-capture functions to receive multimedia content. A user inputs social media content by using hardware of client device 110 or 112, such as a touchscreen on a smartphone or tablet computer. Client device 110 or 112 then transmits content to users operating other clients in the same social networks.

1. User Database

User profile database 204 includes information about registered users. An individual registers as a user by accessing service provider 106 or 108 over network 102 to provide identifying information. In some embodiments, the identifying information may include an email address. Each user then creates a profile. The user profile database 204 contains profile information for each user, which may include a unique identifier, name, images, interests, attributes and the like. The profiles may also include demographic information such as age, gender, nationality, ethnicity, annual income, familial relationships, location, hometown, birthplace, workplace, and the like.

2. Relationships

Relationships database 206 may store information about relationships between users among and between service providers 106 and/or 108. The relationships among groups of users define a social network. The types of relationships may range from casual acquaintances to close familial bonds. In some embodiments, a user can establish a relationship with another user by sending her a message to request the relationship. The recipient can decide to designate the type of relationship. Accepting a request to associate with a user may establish bidirectional communications between users to exchange social media content.

In some embodiments, a user may establish a relationship with other users without approval by the recipient user. This may be referred to as "following" a user or content source. Following a user establishes unidirectional communication between users, where a user can view social media content distributed by a content source, but the content source does not receive social media broadcast by the recipient user. In some embodiments, a user can join a social network but cannot choose each member of that social network. In some embodiments, a user that follows one content source may follow all of the content source's followers. The user database 204 and relationships database 206 are updated to reflect new user information and edits to existing user information that are made through client devices 110 or 112.

3. Searching

Search engine 208 may, for example, identify users, for joining them in a social network. A user can identify other users by searching profile information stored in user profile database 204. For example, the user can search for other users with similar interests or demographics listed on their profiles. In this manner social networks can be established based on common interests or other common factors. Search engine 208 can be used by service provider 106 to identify and recommend relationships to users.

4. Management

A content manager 210 may provide a free flow of social media between users of social networks. Social media may be distributed by a user of a social network to other users of their immediate social network. Social media messages may include text, still images, video, audio, or any other form of media or electronic data. For example, a user can compose a message by using a client device 110 or 112 that accesses server 202 of service provider 106 over network 102. The message is uploaded to server 202 by the user. Server 202 can then send the message to social networks that have the sending user in common Users of social networks may receive and can review the message on client devices 110 or 112. In this manner, users of a social network can become apprised of information posted by other users of the same social network. Content manager 210 can also operate to store social media content.

A message can be sent from a user operating client device 110 to a user operating client device 112. For example, suppose a user sends a message from her smartphone. This message can be received by a user in the same social network through a communications channel and on a personal computer client device. Another user in the same social network may receive the same message at his tablet computer. The endpoint clients at which particular users receive social media are under control of the receiving users and not of concern to the sending user. Service provider 106 allows a user from any client device to send a message to multiple users at different endpoint client devices by simply addressing the message to a social network, without knowledge of specific endpoint clients devices associated with users in the social network.

III. Predicting Demographics

Demographics about authors of social media can be predicted by way of a variety of methods. The systems and methods described herein essentially generate a prediction model comprising learned information about features from social media and known user demographics, and then apply the dataset to social media of users with unknown demographics to predict their demographics.

Figure 3:
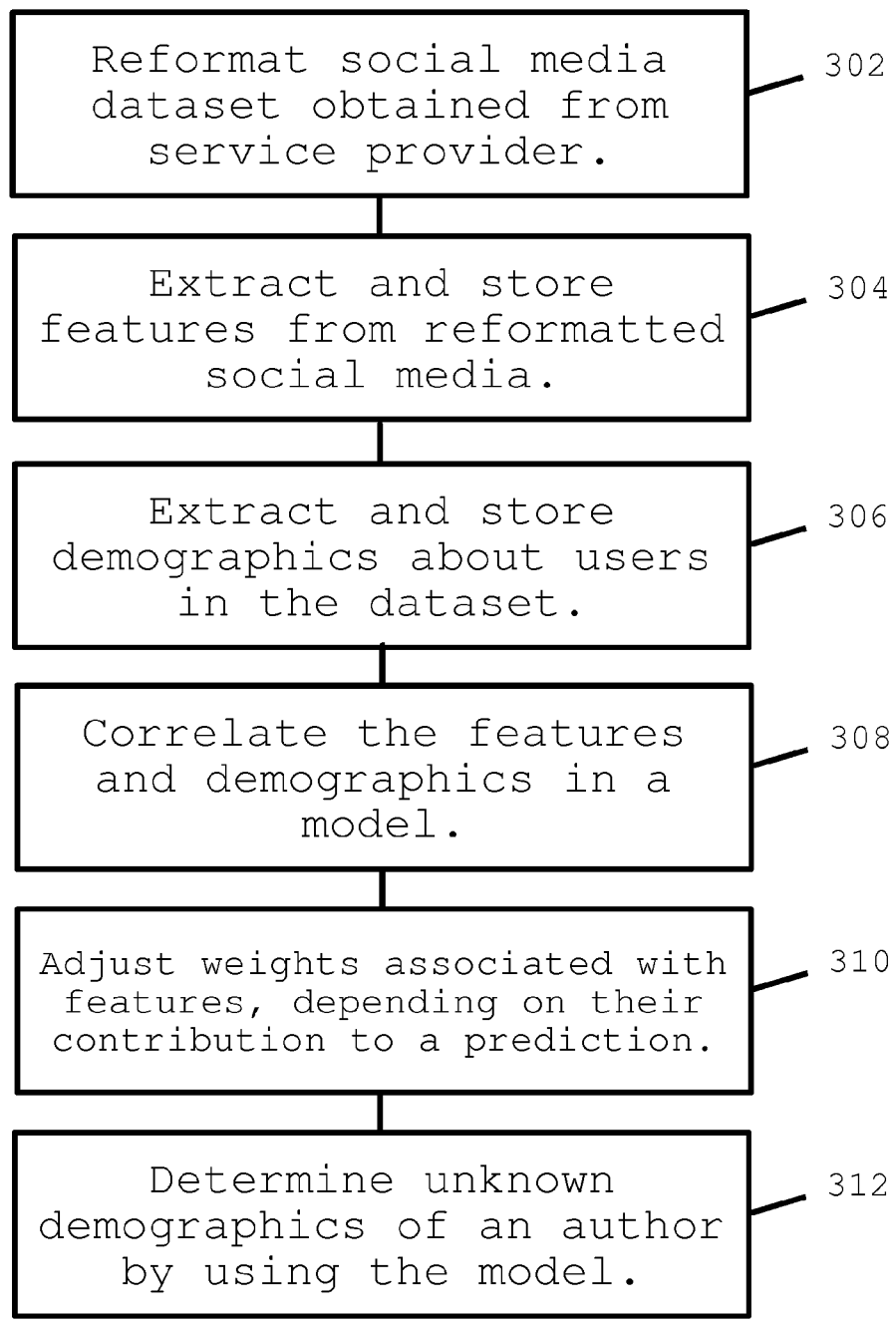
FIG. 3 is a flowchart for a method of creating a model that correlates features from social media with known user demographics that can be used to predict unknown demographics of authors of social media according to embodiments of the invention.
Figure 4:
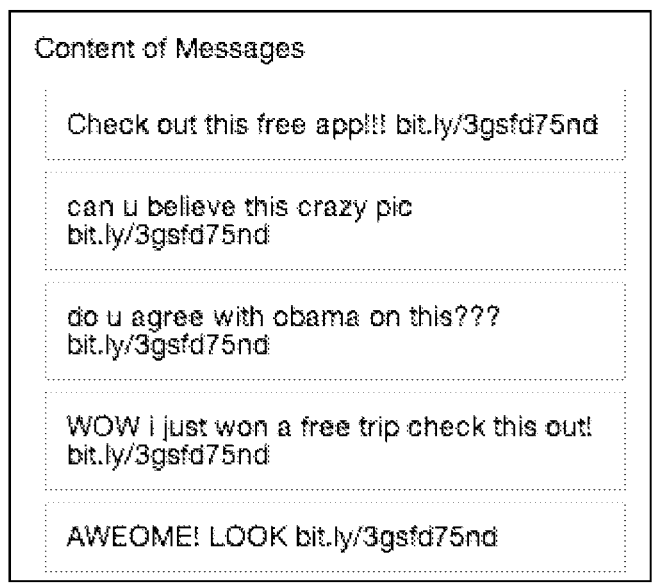
FIG. 4 is a list of TWITTER tweets authored by users of a social networking service provider.

FIG. 3 is a flowchart for a method of creating a model that correlates features from social media with known user demographics that can be used to predict unknown demographics of authors of social media. A set of social media from a service provider may be reformatted, according to step 302. The social media used in the method shown in FIG. 3 may comprise messages authored by users of service provider 106 or 108. For example, FIG. 4 is a list of TWITTER tweets authored by a user of a TWITTER service provider.

Features from the reformatted social media are extracted and stored in a dataset, according to step 304. Known demographics about authors of the social media are extracted and stored in the dataset, according to step 306. In some embodiments, the known demographics are retrieved from the same service provider as the social media, a different service provider, or combinations thereof. The extracted features and known demographics are correlated by using weights, and stored as a model, according to step 308. The weights used in the model are adjusted depending on how features contribute towards making a prediction about a demographic of an author, according to step 310. The model is then used to predict unknown demographics about authors of social media, according to step 312.

Figure 5:
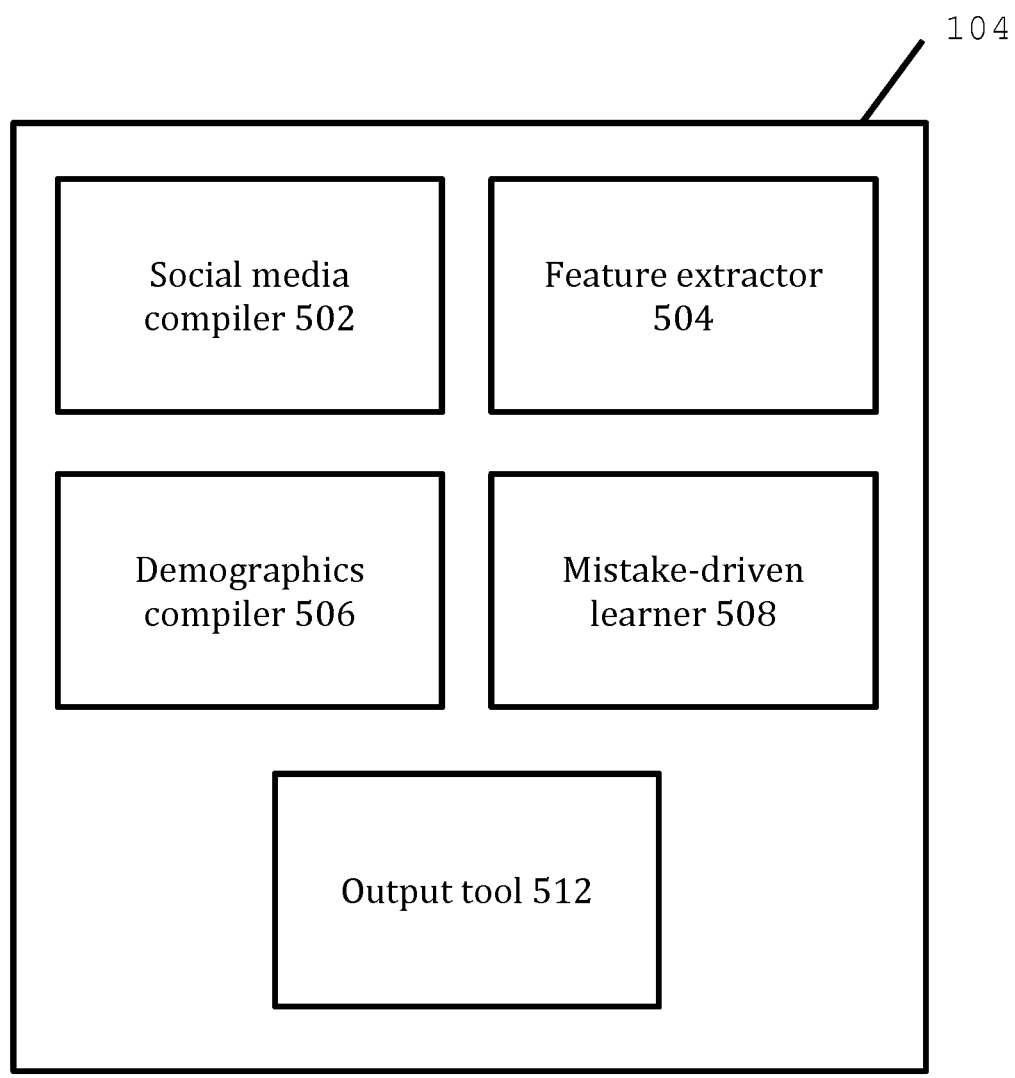
FIG. 5 illustrates a prediction system according to embodiments of the invention.

The systems and methods described herein may be implemented as predictor 104 to predict unknown demographics of authors of social media based on content of the social media, metadata, and the like. FIG. 5 illustrates a prediction system according to embodiments of the invention. Predictor 104 includes social media compiler 502, feature extractor 504, demographics compiler 506, mistake-driven learner 508, and output tool 512. These items are discussed in detail below.

Predictor 104 can be used alongside social media analytics operated by third parties. Third parties engaged in analyzing social media, to determine the sentiment of a particular subject, can use predictor 104 to identify demographic groups that bias a sentiment analysis. Messages that mention a particular subject can be compiled by predictor 104. The compiled messages can be analyzed to predict demographics about users that are expressing a sentiment about the particular subject. Third parties can then alter their marketing or policy strategies based on predicted demographics of users that express a certain sentiment about the particular subject.

For example, an analysis of TWITTER tweets that mention a new commercial product may indicate that it is liked by 40% of people, and disliked by 60%. Predictor 104 can analyze the tweets from these two groups to determine their demographics. The analysis may predict that youths in New Mexico like the new product and that middle-aged people in California dislike the new product. Accordingly, this information can be used to improve marketing strategies designed to target people in California. In some embodiments, predicted demographic information can be used to alter marketing and distribution strategies to target people who express a greater interest in a subject, or to identify unknown markets of people for a particular subject.

1. Compiling Data

A sample set of social media messages and known author demographics may be input into predictor 104 to generate a model for predicting unknown demographics of users in other social media messages. The sample set may include messages received in real-time or periodically received from social media sent over network 102 from client 110 or 112 through service provider 106 or 108. The social media may be from different users, filtered for particular keywords, generated or received at particular times, or any combinations thereof. The messages can be about one or more topics with content that varies in degrees of similarity.

In some embodiments, social media may be received in a desired format or predictor 104 may itself reformat the social media. In some embodiments, social media may be acquired by predictor 104 from third parties that receive and package data. For example, social media messages may be purchased from companies, such as GNIP, TOPSY, DATA-SIFT, and the like. These companies purchase rights to social media output by service providers, such as FACEBOOK and TWITTER. These companies may resell portions of their data, or sell a real-time streaming service, to customers.

In some embodiments, predictor 104 includes social media compiler 502, which enhances and otherwise modifies social media to conform to a standard format. Many suitable formats exist, such as JSON, for example. Although a format may vary from service to service, an appropriate format may be incumbent on metadata that lets other parts of predictor 104 know which part of a message is its body, a time the message was created, an author of the message, account identification, and the like.

2. Tracks and Features

Social media messages can be uploaded to feature extractor 504 through an automated or manual process. Feature extractor 504 extracts potentially distinguishing data in social media that can be used to predict demographic information about users. This potentially distinguishing data may be referred to as "features." Features in a social media may include an amount, type and combination of text, video, sound, icons, color, or images that are distributed by different users. Features also include metadata, such as timestamps when messages were sent, source locations or user identification information. For the sake of brevity, this disclosure focuses on textual features in social media messages.

Feature extractor 504 parses social media messages according to tracks. Tracks define how features are extracted from a social media message, and may include locations or types of fields within a message, for example. A field is a part of a record that represents an item of social media. This may include name, location and description fields in a profile. Content in fields of messages and corresponding profiles may vary considerably with each user and between users.

Tracks may be automatically set based on optimization calculations or by a user to define the types of features that will be extracted from messages. Feature extractor 504 then extracts features from each of the subset of received and reformatted messages. For example, a track of words parses a message based on spaces or punctuation between characters.

In general, tracks can be defined by n-grams. An n-gram is a sequence of n-items from a given sequence. The items can be words, characters, phonemes, syllables, or the like. For example, a trigram of words corresponds to three adjacent words. In some embodiments, different types of features may include combinations of word or character n-grams. An n-gram could be thought of as a moving window that slides across a sentence and picks out every n-word/character groups in that sentence. In some embodiments, a track can define a type of field in messages. A track can also define metadata, content-based data, and time-based data. Content-based data may include the substance of a message or a username. Time-based data may include the time that a message was created or sent.

Combinations of tracks may be used to predict different demographics. For example, a country location of a social media author may be predicted by using three different tracks on a single message. The first track extracts characters, the second track extracts words from a location field, and the third track extracts a bigram of words. Predictor 104 may distinguish between identical features in different tracks. For example, "Virginia" is distinguished in a username from a location field of a profile. Using a combination of tracks may be advantageous because, for example, an entire word and part of the word in a field may be useful for predicting a demographic.

In some embodiments, word n-grams are of a size 1 to 10, 2 to 200, or more preferably from 1 to 5. For example, an n-gram of words is extracted from text of a message, or free-text metadata associated with each message, such as a user's description field in TWITTER.

In some embodiments, character n-grams are of a size 1 to 100, 10 to 1000, or more preferably from 3 to 15. For example, an n-gram of characters is extracted from text of a message or metadata associated with the message including, on TWITTER, the user's screen name, display name, self-description, location, external URL, profile colors, user ID, and the name of the application that generated the message.

In some embodiments, time-based features may be used, in which feature extractor 504 divides a calendar into discrete blocks of time, and produces a feature for each pair of time-blocks in which users create messages. In some embodiments, feature extractor 504 divides a calendar into discrete blocks of time, and produces a feature for the time-block in which a user's account was initially created.

Feature extractor 504 does not have to tokenize unsegmented languages such as Chinese, nor does it have to perform morphological analysis on languages, such as Korean. For example, extracted character-level n-grams provide useful information regardless of languages. A specific string of characters rather than a word may be better at predicting a particular demographic. For example, an emoticon may be a certain string of characters with spaces that indicate an author is male. Although feature extractor 504 does not use language-specific processing, in some embodiments, the prediction could be supplemented with language specific features that comprise words from a dictionary.

Tracks may be very specific, such as particular keywords. Essentially, each feature may be a simple Boolean indicator representing presence or absence of a word or character n-gram in a set of text strings within a particular field of a message defined by a track. There are ultimately many ways to define tracks and features.

3. Model Creation

A method for correlating features and demographics about authors of social media to create a model is disclosed herein. The compilation of features and known demographics from social media described above may be referred to as training, ground truth, or reference data. The model comprises reference data, for example, tweets and demographics about authors of the tweets (e.g., a 43-year-old male who lives in France).

Demographics compiler 506 retrieves known demographics of authors of social media and associates those demographics with extracted features. Known author demographics function as supervised "labels." The known demographics are stored with the extracted features. Features obtained from a first service provider may be labelled with demographics obtained from a second source. Labelled data may be used by a model to predict demographics about authors of unlabelled social media. For example, features from TWITTER tweets may be labelled with user demographics from FACEBOOK profiles in a model. Features from a first source and demographics from a second source may be linked because they are associated with the same user. In some embodiments, a source of social media has little or no demographic information but another source has structured demographic information. In some embodiments, predictor 104 may search for a link (e.g., URL) to a second source in a profile of an author of a social media message from a first source.

In some embodiments, features from a second source can be used to supplement features in a model that predicts demographics in social media from a first source. However, extracting and using features, rather than demographics alone, from a second source may skew a demographic prediction because a type and amount of social media content may vary between the two sources. Thus, for example, using features from FACEBOOK to supplement a model for predicting demographics about users of TWITTER may be unreliable because FACEBOOK messages are structured differently than TWITTER tweets, which are small unstructured messages. Consequently, features from a second source may skew a prediction because the features may be weighed more heavily than features extracted from a first source.

In some embodiments, a seed set of users that authored social media is identified to build the reference data. The reference data can be split into social media messages and demographics from a second source that have common authors. Generalizations are made about correlations between tracks and/or features and particular demographics. The model can subsequently learn from the seed set of users by analysing any new messages they generate because their demographics are already known.

4. Learning Weights

Features may be weighted according to their correlations with demographics. A feature that is strongly correlated with a demographic may be assigned a greater weight than a feature that is weakly correlated with the demographic. The model translates features into a prediction based on the learning weights. The learning weights are values that are normalized across features, tracks, or combinations thereof, to represent relative contribution from each feature towards making a prediction about a certain demographic. A feature may be assigned different learning weights for different demographic values corresponding to the same demographic category. For example, the word "stocks" may be an extracted feature. A gender demographic may associate two weights with "stocks." The first weight corresponds to 0.52-male and the second weight corresponds to 0.40-female.

The model used to predict unknown demographics of authors of social media include tracks, features, and their learning weights. Mistake-driven learner 508 of predictor 104 can optimize learning weights of tracks and features for predicting demographics. Mistake-driven learner 508 updates the model by adjusting weights of features labelled with demographics that are sought to be predicted. The adjustments may be based on new social media generated from the seed set of authors of known demographics, other social media from authors of known demographics, or combinations thereof. Thus, mistake-driven learner 508 adjusts the weights of tracks and feature to identify their contribution to making a prediction about an unknown demographic of an author of social media.

In some embodiments, predictor 104 concatenates tracks and features and processes them through a hashing function. Mistake-driven learner 508 may use a hash function to convert features into compact numerical values that can be stored and compared more efficiently. A hash function is any algorithm that maps data of variable length to data of a fixed length called a hash value. Data input can be a string of characters, words, numbers, any combinations thereof, or the like. In particular, at its root, every piece of data is a series of bytes and a hash function takes the series of bytes and reduces it to a smaller series of bytes. This increases the efficiency of predicting demographics based on tracks and/or features stored in a model.

For example, a track and an extracted feature may be a string of characters, and a hashing algorithm may reduce the string to 8 byte. This is regardless of whether or not it is an entire book of text or a number between 1 and 100. The hash algorithm will map one piece of data to a number within a predefined range. A good choice of a hash function produces seemingly randomized outputs, but uses a deterministic process to make those "random" outputs repeatable. For example, MURMUR 3, JENKINS, SPOOKY or any non-cryptographic hash function may be used. A hash function built into JAVA could be used as well.

Using a hashing function facilitates processing different types of features as small numerical values rather than text, categories, names, or the like. Hash values are input into the model. Notably, using a hashing function may preserve the distinction between different tracks, but the particular identities of tracks may not be preserved. In other words, a feature can be rendered as different hash values due to different tracks. Features can then be detected as binary values (yes/no) after they have been hashed and stored into the model.

5. Mistake-Driven Learning

The systems and methods described herein may be used to discriminate between relevant features and noise, to prevent over-fitting. Over-fitting occurs when features and demographics are strongly correlated but the correlation does not generalize well such that it cannot be applied to unlabelled social media to make predictions. For example, a particular street address may be strongly correlated with a particular gender; however, the correlation cannot be generalized as a rule because it is too specific.

"Mistake-driven" learning may be used to prevent over-fitting. A weight is initially assigned to each feature and each of its outcome categories (e.g., demographic values). For example, 150 different weights may be assigned to a feature. Each weight corresponds to a country. The value of each weight corresponds to a correlation between the feature and one of 150 different countries. When making a prediction, feature extractor 504 extracts several features from a social media message and weights for each outcome category are summed. The sum may be referred to as a score.

A score corresponds to a dot product of features and their weights for each outcome category. This may be used to predict, for example, whether an author of social media is from Spain or France, by comparing scores for these outcome categories. An outcome category with a score that is overwhelmingly higher than other outcome categories suggests an accurate prediction for that outcome category. However, the difference between any two scores may be very small. For example, the difference between predicting male or female based on a certain set of features may be 1%.

In some embodiments, mistake-driven learner 508 uses a threshold to determine when a difference between scores is too close to output a reliable prediction. A score for an outcome category associated with a feature that is greater than the threshold difference may cause mistake-driven learner 508 to increase the weight of the feature. On the other hand, scores that are within the threshold may cause mistake-driven learner 508 to not adjust a weight associated with the feature or may decrease its value. Notably, mistake-driven learner 508 treats any prediction that is within the threshold difference from another prediction as a "mistake," regardless of whether the prediction was correct or incorrect. This feature improves subsequent predictions.

Predictor 104 thus learns based on features that yield predictions that are associated with low confidence levels. In some embodiments, the threshold is set to zero and the algorithm only learns if a prediction was incorrect. Increasing the threshold causes learning only when the prediction is wrong or whenever two scores, the highest score and the second best score are within some threshold value (e.g., 10%) of one another. Thus, the threshold is set to determine when predictor 104 will learn. Correct predictions can be treated as mistakes to improve learning by adjusting weights associated with outcome categories that yielded a prediction with a low confidence. Mistake-driven learner 508 thus adjusts feature weights every time a mistake is made and the threshold sets what constitutes a mistake. Weights for each feature are essentially promoted or demoted. This increases the confidence of every prediction by making some adjustments to the weights when "mistakes" are determined. The reference data may iterate over itself to ensure reproducibility of predictions with good generalizations about features and their adjusted weights.

In some embodiments, a learning rate can be used by the systems and methods described herein to determine a magnitude that a weight is adjusted when learning. Whenever a mistake is detected, the learner reduces the weight of that particular outcome category for the feature by the learning rate (e.g., 1%). On the other hand, the weight for the correct output category can be increased by the same or another rate when a correct prediction is made that exceeds another threshold that indicates a higher confidence level.

In some embodiments, a development set of social media can be used to determine a preferred configuration of a model that includes tracks, a learning rate, a mistake threshold, and the like. The development set includes unlabelled social media that is associated with authors of known demographics. Accordingly, the development set can be used to adjust a model before it is applied to unlabelled social media in runtime. In some embodiments, predictor 104 does not learn from social media in the development set. Instead, the development set is used to tune or set parameters for learning. In particular, the development set may be useful for setting a mistake threshold and learning rate, and to determine the quality of a model. The development set may also contain a different set of users than in the reference data, and helps prevent over-fitting by removing spurious correlations.

6. Disk-Based Learner

In some embodiments, the mistake-driven learner 508 is disk-based. Mistake-driven learner 508 keeps reference data (e.g., Tweets) in non-volatile memory (e.g., disk drive) rather than volatile (e.g., local) memory to analyze unlabelled social media. When analyzing an unlabelled message, predictor 104 generates and regenerates features from reference data and leaves the unlabelled message in non-volatile memory, where it can be easily retrieved. This allows predictor 104 to hold a much larger number of features and weights because unlabelled social media does not need to be stored in local (volatile) memory at the same time. Predictor 104 may thus learn from social media that is not held in local memory.

For example, 4 million TWITTER Tweets and corresponding labels indicate whether authors are male or female. Existing learning techniques read in those 4 million Tweets and store the messages with the labels in local memory. Then reference data is iterated in local memory when testing unlabelled data. However, using a much larger amount of data requires a lot of memory that prevents holding all the weight information in local memory.

The systems and methods described herein, for example, leave the 4 million Tweets and their labels (i.e., reference data) in a file stored in non-volatile memory and only store each specific Tweet being analysed in local memory. A Tweet is read from the file, mistake-driven learner 508 learns from it, the Tweet is removed from local memory, and a following Tweet is read into local memory. Thus, the data is iterated over while it is saved to a file in a non-volatile disk. This allows for scaling up the amount of data that can be kept in memory to predict demographics.

In particular, two things contribute to scaling up the amount of data used by predictor 104. One is the amount of social media messages used in reference data, and the other is the amount of features extracted from each unlabelled message. Storing this combination of data in local memory has required limiting an amount of features extracted or using a smaller reference dataset. In contrast, the methods and systems disclosed herein use a disk-based learner rather than storing everything in local memory. Thus, predictor 104 can learn from billions of labelled social media and extract an enormous amount of features because it is not constrained by local memory.

The disk-based learner stores links to features and outcome categories. A link refers to an association between a feature and outcome label. The embodiment of this correspondence is essentially what a weight represents. As a quantity of features and outcome categories increases, the quantity of weights increases dramatically because a weight is associated with each combination of features and outcome categories. This can become computationally expensive, dramatically increase memory consumption, and increase a time to render predictions. The systems and methods described herein increase the rate of rendering prediction and are more memory efficient because they use the disk-based learner, which also allows predictor 104 to learn from larger amounts of features.

In some embodiments, weights are also quantized to improve processing and memory efficiency. Rather than representing a weight like a number, quantization lessens the amount of memory required to store weights because they are rounded to a distinct value. For example, each weight may be represented as a byte in memory. Thus, 8 bits of information stores a maximum 256 different possible weights. The systems and methods described herein may lessen the amount of memory required to store a weight by one-eighth over a 64-bit piece of information by quantizing the weights. Consequently, eight times as many weights can be stored in this example.

In some embodiments, a time for rendering predictions can be decreased by observing that many weights used by mistake-driven learner 508 have a value of zero. This occurs when features are not correlated with an outcome category. Weights for these combinations may be stored as an array of zeros in memory. Then a score of a combination is determined by multiplying weights by the number of features, which is like a dot product calculation.

In some embodiments, features are only added to a model after their weights have changed, and features with weights that have not changed over some period of time are removed from the model. This improves prediction speed because a much larger number of possible features and outcome categories are stored due to the fact that the amount of information required to store the data is much smaller.

In some embodiments, a sparse representation of weights could be used by not storing any weights set to zero. Using a sparse representation also improves memory efficiency, especially when combined with quantized representations of weights. This combination allows for learning from tens of millions or hundreds of millions of messages to learn a much broader type and selection of features that are better predictors of demographics.

As detailed above, predictions are explicitly agnostic of language based features. This language agnostic capability is enabled partly because of the abovementioned memory savings. For example, generating a feature for every five characters in a string of data produces a much larger number of features than extracting one feature per word or one feature per pair of words. More specifically, a track of five characters across 140 characters produces 135 features, whereas only 11-15 features may be extracted by a track of words across the same length of characters. Using language agnostic tracks, such as character n-grams, produces an order of magnitude larger feature space but does not require a commensurate increase in memory. Thus, predictor 104 works well regardless of whether features include words in English, French, Chinese, Japanese, Korean, or any other language.

7. Predicting Demographics

FIG. 6 is a table showing examples of features that may be used to make various predictions about different demographics of authors of social media. For example, the features may be used to predict a gender, location, and/or a specific age of an author of social media. A model that generates features for predicting demographics of authors of social media may be represented as a compact dataset that includes tracks, features, and weights. The model includes learned associations between tracks or features and author demographics. The model uses this information to make predictions of a variety of different demographics.

In some embodiments, a prediction is output with a confidence level. For example, the author of a social media message may be predicted as male, rather than female, with a confidence level of 95%. A confidence level may be output for each score for outcome categories. The confidence level is a measure of the certainty associated with a predicted demographic. The confidence level could be calculated as a ratio between the highest and second highest scores for outcome categories. A smaller ratio may correspond to a low confidence level, and a larger ratio may correspond to a higher confidence level. In some embodiments, a confidence level can be calculated by taking the top score of an outcome category and divide it by the sum of all of the other scores.

Outcome category scores can be used by the development set to map accuracies of predictions based on confidence levels. For example, a confidence level of 1.5 or greater may correspond to a prediction that is 98% accurate. Accordingly, a prediction is incorrect 2% of the time for a confidence level of 1.5 or greater. Other thresholds maybe set, for example, a 1.25 confidence level may be 95% accurate and a 1.01 confidence level may be 83% accurate. Thus, a score is output with a confidence metric that corresponds to a probability of accuracy. For example, a gender demographic prediction may be male with 98% probability and female with 83% probability that either prediction is correct. A threshold may be set to output a prediction only when it is at or greater than a particular confidence level (e.g., 95% accurate).

In some embodiments, predictor 104 can predict a number from a range, rather than just categories. For example, a demographic prediction may be a particular age (33.2 years old) rather than a category of ages (e.g., an adult). In these embodiments, predictor 104 can conduct a regression analysis using multiple binary classifiers to predict a demographic value. Each binary classifier predicts whether or not a person is above or below a specific numerical value. Each binary classifier analyzes the same data but renders a different prediction. The output of each binary classifier is aggregated into a single prediction by identifying a value that is least inconsistent with the outputs from the multiple binary classifiers.

In some embodiments, each binary classifier can predict whether or not a person is associated with a subset of a range of values. Thus, for example, a first prediction may correspond to a subset of a range, a second prediction may correspond to a subset of the subset, and so on, until a prediction for an exact value is determined as the predictions become consistent around a predicted value. In some embodiments, this analysis may be used to predict a specific age, zip code, salary, or the like.

A confidence estimate may be determined for a predicted number. The confidence estimate is determined by how consistent each binary classifier is associated with a predicted value that is ultimately rendered by predictor 104. A higher confidence score corresponds to fewer inconsistent predictions among multiple binary classifiers. In some embodiments, the outputs from the binary classifiers are passed through an algorithm that searches for a point at which the data is most consistent. This may be referred to as a hypothesis. Predictor 104 measures how consistent the hypothesis is according to the outputted predictions. This embodiment requires an extra step where the outputs are converted into a numeric score based off of many different predictions.

For example, a confidence score is higher when numerous binary classifiers produce consistent outputs about a particular demographic value. The level of consistency may be used in place of a ratio to determine a confidence level. For example, consistent outputs yield an average error that increases as more inconsistent outputs are generated by other binary classifiers in the same group. Thus, a confidence level is determined according to how well the quality of the outputs is for a group of classifiers. This may be thought of as a reverse confidence estimate that is determined in a slightly different way when predicting a number in a continuous range, like age or salary. For example, a prediction of 19.5 years old may have a confidence level of plus or minus 3.8 years. There are essentially different ways of expressing the error in a prediction, but it relates to the same notion of confidence.

In some embodiments, an iterative process adds features to an ordinary linear regression model. In this embodiment, there are initially no features in this model and a mean age is used as a starting point for a prediction. The ordinary linear regression is used for feature generation, similar to that used by the-mistake driven learner, to correct the mean value. For example, a mean value is associated with each feature. The dataset is iterated over to determine which feature best correlates with a residual after subtracting the mean value. In other words, the features that explain the differences from a mean value are removed. The first identified feature should reduce the error the most. This process is iterated over to recalculate weights used to determine a starting point (mean) for each prediction. A weight vector includes weights for each feature that can be used on a dataset with unknown demographics. The sum of the feature weights are then used to predict a number from a range.

A decoder will read the model into memory, where weights are assigned to features, and then unlabelled social media is passed through the model. The data output by predictor 104 includes social media annotated with predictions of demographics and corresponding confidence levels. In some embodiments, predictor 104 can analyse different types of data so long as they are properly formatted. An API can allow a user to define the formats for the input data.

8. Other Applications

Predictor 104 may include output tool 512. Output tool 512 may include a user interface that allows users to customize predictor 104 for specific applications. Outputs from predictor 104 could be used to tailor advertisements to people in particular demographic categories. For example, a third party advertising on Twitter can target males ages 18 to 36, in Florida. In some embodiments, outputs of predictor 104 can be used to determine products that interest people of particular demographics. Predictor 104 can also help to assess whether advertisements are effective in a proper demographic group. Accordingly, TWITTER can "promote" (i.e., showcase) advertisements to a particular demographic that has a greater likelihood of purchasing the advertised product.

Outputs from predictor 104 can be used to study a specific population in an experiment. For example, predictor 104 can be used to track changes in obesity rates in the United States based on social media from people using services like TWITTER. Specifically, tweets about exercising that are broadcast on TWITTER can be used by predictor 104 to determine whether these messages correlates with lower obesity rates in particular regions. Identifying this relationship may be useful to public health policymakers to understand how social programs are affecting people in certain demographic categories. For example, predictor 104 can predict whether a social program has a stronger effect on people in urban areas, under the age of 15, or former veterans, for example.

Outputs from predictor 104 can also be used for criminal investigations. For example, predictor 104 can predict whether a 40 year old man is pretending to be a 15 year old girl in a chat room. This automates what law enforcement agencies are doing manually to identify people who are lying about their demographics. In another related example, demographics about a user sending threatening tweets to a celebrity can be predicted within a certain confidence level by using the methods disclosed herein. This soft compiler of demographics for law enforcement helps identify possible suspects.

Although various embodiments, each of which incorporates the teachings of the present invention, have been shown and described in detail herein, those skilled in the art can readily devise many other embodiments that still utilize these teachings. The various embodiments described above have been presented for purposes of illustration and description. They are not intended to be exhaustive or to limit the invention to the precise forms disclosed, and many modifications and variations are possible in light of the above teachings. For example, predictor 104 can be applied to any messaging system, or any dataset to predict an unknown value, within a range of values, based on another dataset with known values, such as a stock prediction system. The invention can be construed according to the Claims and their equivalents.

The invention claimed is:

1. A method for creating a dataset that relates features in social media messages to demographic information, comprising:
    extracting a plurality of features from a plurality of social media messages that are authored by a plurality of users of a social media service;
    retrieving, using a processor, a plurality of demographics for the plurality of users that authored the plurality of social media messages;
    correlating the plurality of features from the plurality of social media messages with the plurality of demographics; and
    storing the correlation in memory,
    wherein the plurality of social media messages that are authored by the plurality of users are from a first social media service, and the plurality of demographics for the plurality of users that authored the plurality of social media messages are from a second social media service.

2. The method of claim 1, wherein the first social media service is TWITTER and the second social media service is FACEBOOK.

3. The method of claim 1, wherein the plurality of social media messages are associated with a plurality profiles for the plurality of users that authored the social media messages.

4. The method of claim 3, wherein the plurality of profiles include links to the second social media service.

5. The method of claim 1, wherein the plurality of demographics include gender and at least one of age, location, and marital status.

6. The method of claim 1, wherein the plurality of features comprise an n-gram of words and an n-gram of characters.

7. A method for creating a dataset for predicting demographics of users that author social media messages, comprising:
    designating a plurality of tracks that comprise fields in a dataset of social media messages stored in memory;
    extracting a plurality of features from the dataset of social media messages based on the plurality of designated fields in the dataset of social media messages;
    retrieving a plurality of demographics that comprise a plurality of alternative demographic values and that are associated with the plurality of features;
    generating, using a processor, a plurality of adjustable weights associated with the plurality of alternative demographic values from two or more of the plurality of features; and
    predicting demographics of users that author social media messages based on the plurality of adjustable weights associated with the plurality of alternative demographic values from the two or more of the plurality of features.

8. The method of claim 7, wherein the plurality of tracks comprise an n-gram of words.

9. The method of claim 7, wherein the plurality of tracks comprise an n-gram of characters.

10. The method of claim 7, wherein the plurality of demographics comprise a gender, age, or location.

11. The method of claim 7, wherein the social media message is retrieved from a first social media service and the plurality of demographics are retrieved from a second social media service.

12. A method for predicting a demographic about an author of a social media message, comprising:
    extracting a plurality of features from a social media message stored in memory;
    determining, using a processor, a plurality of weights associated with the plurality of extracted features; and
    predicting a demographic value about an author of the social media message based on a sum of the plurality of weights associated with the plurality of extracted features;
    outputting a confidence level for the predicted demographic value that corresponds to a difference between the sum of the plurality of weights associated with the predicted demographic value and a sum of a plurality of weights associated with another demographic value,
    wherein the plurality of weights associated with one of the plurality of extracted features comprises a first weight corresponding to a first value for a particular demographic about the author of the social media message and a second weight corresponding to a second value for the particular demographic about the author of the social media message.

13. The method of claim 12, wherein the sum of the another demographic value is lower than the sum of the predicted demographic value.

14. The method of claim 12, wherein the confidence level corresponds to an accuracy that the predicted demographic value corresponds to an actual demographic value of the author of the social media message.

15. The method of claim 12, further comprising:
    outputting the predicted demographic value when the confidence level exceeds a threshold.

16. The method of claim 15, further comprising:
    updating at least one of the plurality of weights when the confidence level is below the threshold even though the prediction is correct.

17. The method of claim 12, wherein the predicted demographic value comprises a marital status.

18. A system for creating a dataset that relates features in social media messages to demographic information, comprising:
    a memory that stores a plurality of features from a plurality of social media messages that are authored by a plurality of users of a social media service;
    a processor for retrieving a plurality of demographics for the plurality of users that authored the plurality of social media messages, and correlating the plurality of features from the plurality of social media messages with the plurality of demographics,
    wherein the plurality of social media messages that are authored by the plurality of users are retrieved from a first social media service, and the plurality of demographics for the plurality of users that authored the plurality of social media messages are retrieved from a second social media service.

19. The system of claim 18, wherein the plurality of social media messages are associated with a plurality profiles for the plurality of users that authored the social media messages.

20. A system for predicting a demographic about an author of a social media message, comprising:
a memory that stores a social media message;
a processor that extracts a plurality of features from the social media message stored in memory, determines a plurality of weights associated with the plurality of extracted features, predicts a demographic value about an author of the social media message based on a sum of the plurality of weights associated with the plurality of extracted features, and outputs a confidence level for the predicted demographic value that corresponds to a difference between the sum of the plurality of weights associated with the predicted demographic value and a sum of a plurality of weights associated with another demographic value,
wherein the plurality of weights associated with one of the plurality of extracted features comprises a first weight corresponding to a first value for a particular demographic about the author of the social media message and a second weight corresponding to a second value for the particular demographic about the author of the social media message.

* * * * *